Jan. 19, 1932.   T. A. BEANEY   1,841,517
TRANSMISSION MECHANISM
Filed Dec. 19, 1928   4 Sheets-Sheet 3
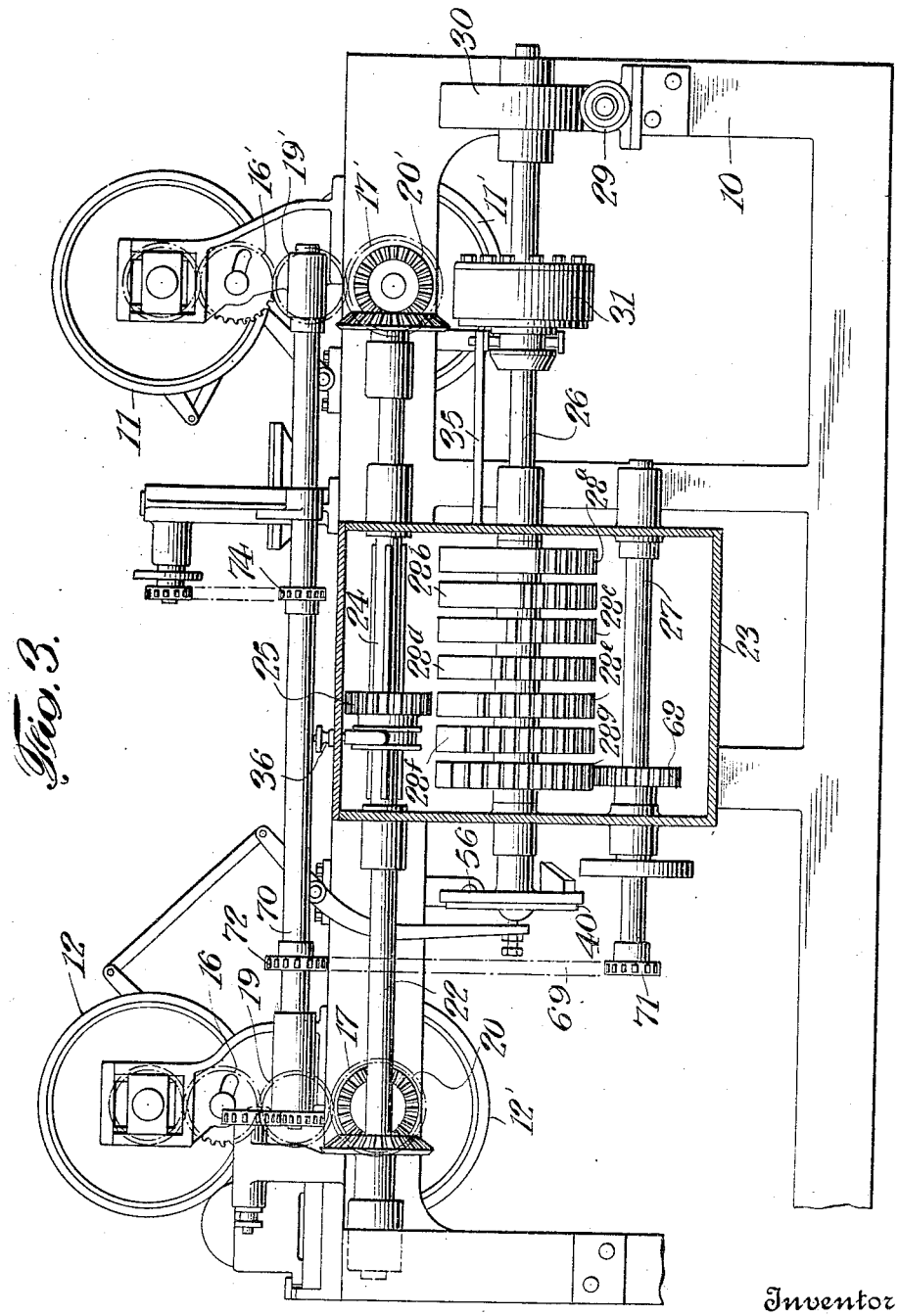

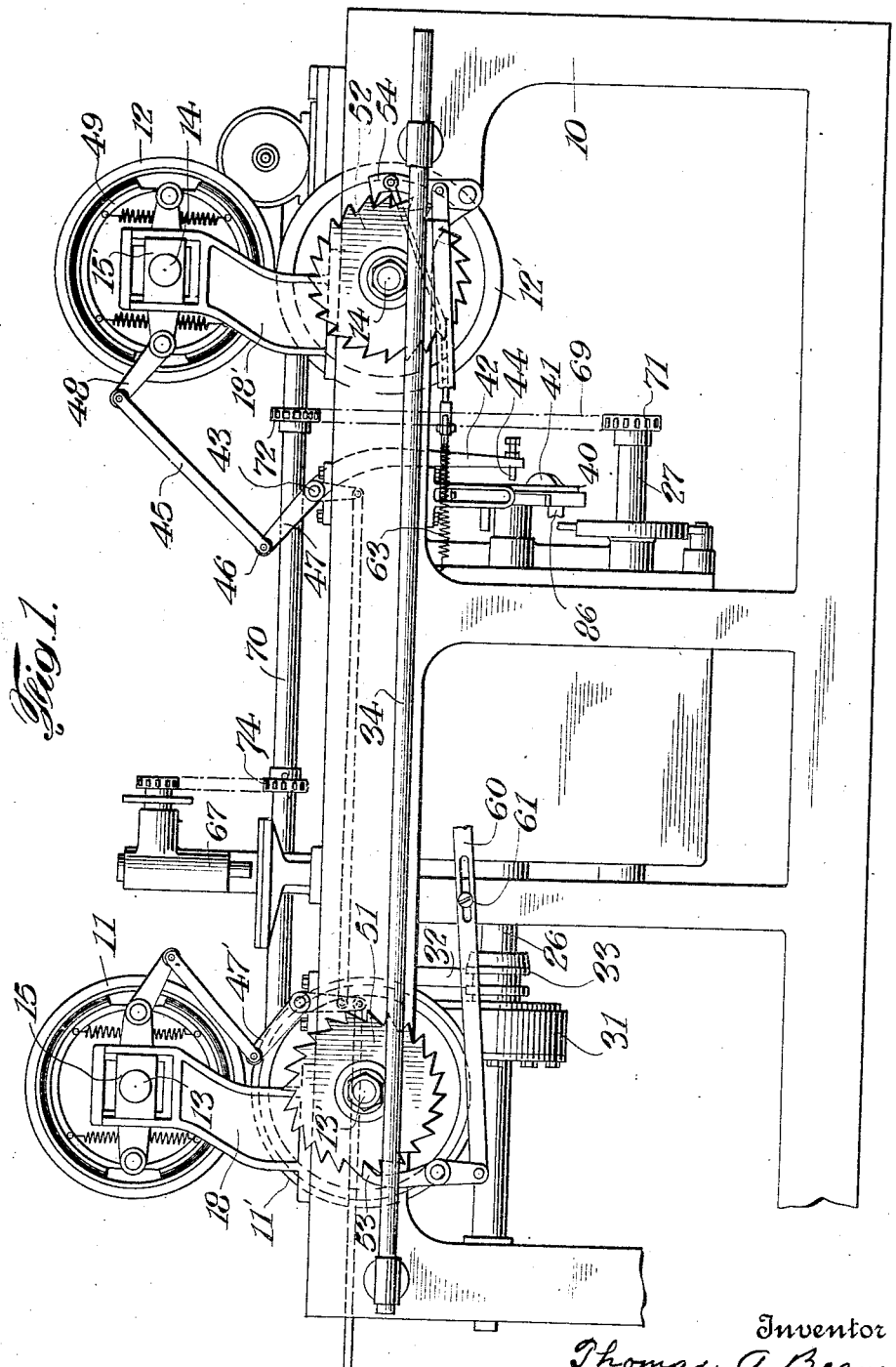

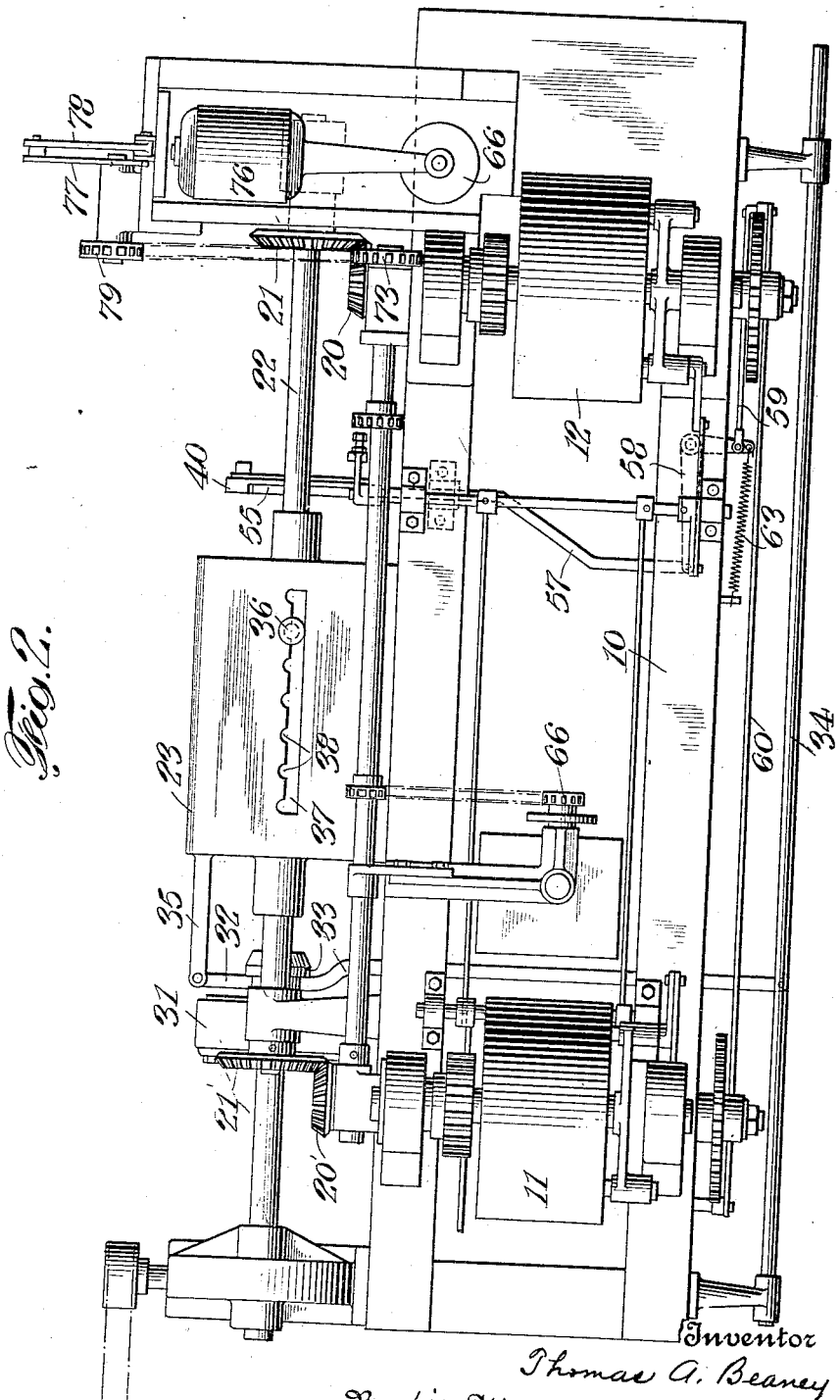

Jan. 19, 1932.  T. A. BEANEY  1,841,517
TRANSMISSION MECHANISM
Filed Dec. 19, 1928  4 Sheets-Sheet 4
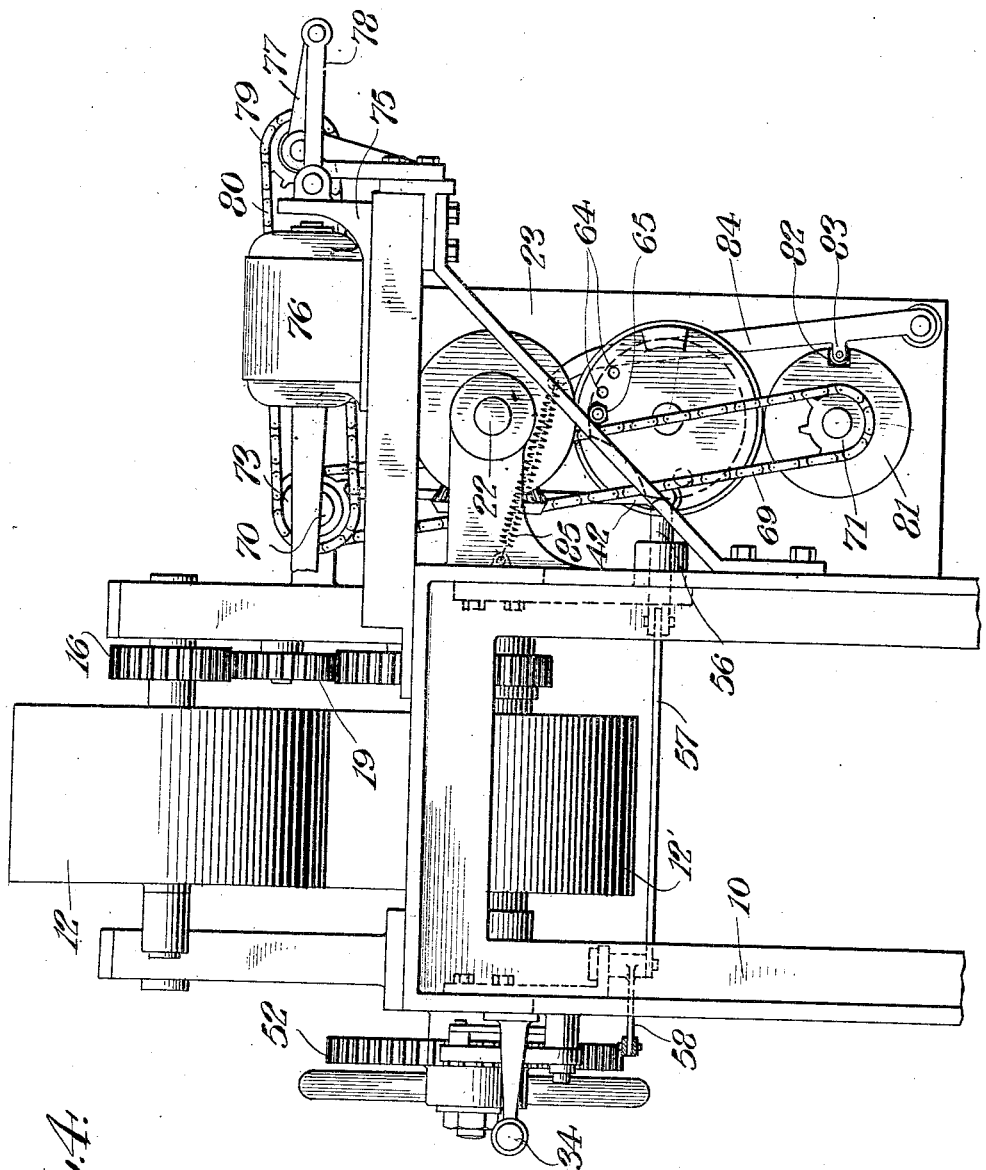
Inventor
Thomas A. Beaney
By his Attorneys
Hoguet & Neary Patented Jan. 19, 1932

1,841,517

UNITED STATES PATENT OFFICE

THOMAS A. BEANEY, OF POUGHKEEPSIE, NEW YORK, ASSIGNOR TO BEANEY RUBBER COMPANY INC., OF NEW YORK, N. Y., A CORPORATION OF NEW YORK

TRANSMISSION MECHANISM

Original application filed March 10, 1927, Serial No. 174,174. Divided and this application filed December 19, 1928. Serial No. 326,914.

The present invention relates to transmission mechanism and more particularly to an arrangement for transforming continuous rotary movement into intermittent rotary movement such as that shown in my co-pending application, Serial No. 174,174, filed March 10, 1927, of which this application is a division. The invention provides a mechanism for varying the degree of rotation of the intermittently driven device and also includes means for positively bringing the intermittently driven device to rest and locking it in its stationary position.

In some types of intermittent drives a spur gear from which a number of teeth are omitted is employed, but it has been found that, due to inertia, the driven shaft will continue to rotate a slight amount after being disengaged by the driving gear; the teeth of the driven element are thus misaligned with respect to the teeth of the driving element upon re-engagement. The present invention is designed to overcome this objectionable feature by employing a locking device to positively stop the driven gear immediately upon disengagement with the driving gear, so that upon re-engagement the teeth of both gears mesh accurately.

In order to provide for several periods of intermittent rotation of the driven shaft, the invention employs a plurality of mutilated gears each of which differs from the others in that it has a larger or fewer number of teeth. Suitable shifting means are provided to align an axially moveable gear with the desired gear of the group of mutilated gears to obtain a selected period of intermittent drive.

The invention will be more fully understood from the following description taken in connection with the accompanying drawings, in which:

Figure 1 is a side elevation of a preferred embodiment of the invention;

Figure 2 is a top plan view of the machine shown in Figure 1;

Figure 3 is a side elevation partly in section, illustrating the type of gearing employed; and Figure 4 is an end elevation of one end of the machine.

In my co-pending application referred to above the intermittent drive is shown as applied to a machine for cutting off tire flap stock, and for the purpose of illustration the present invention is described as a machine for intermittently feeding and cutting stock, although it is apparent that its use is not limited to a machine of this type.

In the drawings, a base 10 supports the constituent parts of the machine. The stock is fed to a cutting device by one or more pairs of rolls 11, 11', 12, 12', the rolls of each pair co-operating to feed the stock as it passes between them. The upper feed rolls 11 and 12 are secured to shafts 13 and 14 respectively, journaled in vertically adjustable bearings 15, 15' on the brackets 18, 18' to permit spacing of the rolls, and are geared to the lower rolls 11', 12', secured to shafts 13', 14', by the gears 16, 16', 17, 17' and adjustable idler gears 19, 19'. As shown in Fig. 3, there is secured at the end of each of the shafts 13', 14' a beveled gear 20, 20' meshing with the beveled gears 21, 21' on the shaft 22. The shaft 22 passes through and is supported in casing 23, which houses the transmission gearing, and is splined as at 24 to permit a shiftable gear 25 to be moved to any one of several positions along the shaft. Also contained within the casing 23 and suitably journaled in the sides of the casing are shafts 26, 27, on the former of which are secured a plurality of mutilated gears 28a, 28b, 28c, 28d, 28e, 28f and 28g. These mutilated gears each have a greater or lesser number of teeth than its adjacent gear, 28a preferably having the fewest teeth and 28g the greatest number of teeth, but the relative positions of the gears is not important.

The shaft 26 is driven by a suitable power means through the reduction gearing 29, 30, a clutch 31 being interposed between the reduction gear and the casing 23. The clutch 31 is controlled by a forked lever 32 engaging a collar 33 and extending from the clutch side of the machine to the opposite side, where it is connected to a control bar 34, the lever being pivoted on an arm 35 secured to the frame of the machine.

In order to obtain an intermittent rotation of the shaft 22 the gear 25 is shifted axially along the splined portion of the shaft by means of a shipper handle 36 until it is in alignment with one of the gears on the shaft 26. The shipper handle extends through a slot 37 in the gear box, the slot having a series of suitably marked notches 37 to hold the shiftable gear in alignment with the selected mutilated gear on shaft 26. As hereinbefore stated, each of the mutilated gears differs from the other in the number of teeth with which each gear is provided. The degree of rotation of the shaft 22 is, therefore, determined by the number of teeth on the mutilated gear meshing with the shiftable gear 25. This intermittent movement is transmitted to the feed rolls through the beveled gears at the end of the shaft 22.

In order to bring the feed rolls to a positive stop when the last tooth of the mutilated gear has disengaged the gear 25, the movement of the feed rolls is first arrested and then stopped in such a position that when the gears 28 and 25 re-engage the teeth will be in proper radial alignment. In order that the movement of the rolls may be arrested, a braking mechanism is employed. The means for actuating the braking mechanism includes a cam plate 40 on the end of the shaft 26, this plate being provided with a circumferentially adjustable cam having an irregular face 41 as well as an irregular periphery 55.

A lever 42, pivoted at 43 to the frame of the machine, is provided with an adjustable follower 44 which cooperates with the cam face 41. A link 45 is pivoted at one end, as at 46, to arm 47 of the lever 42 and transmits movement of the lever to the operating arm 48 of an internal brake 49 cooperating with the roll 12. A similar braking device is associated with the roll 11, a connecting rod 50 transmitting the movements of lever 42 to arm 47' of the brake operating mechanism associated with roll 11. The cam 41 is so timed that just prior to disengagement of the gears 25 and 28 the brake operating mechanism is actuated to gradually apply the brakes to the rolls.

In order that the gear 25 may be brought to rest at the proper time to insure accurate meshing of the teeth of gears 25 and 28, rachet discs 51, 52 are secured to shafts 13', 14', these discs cooperating with pawls 53, 54 pivoted to the frame of the machine. These pawls are held out of engagement with the rachets during rotation of the rolls, but as soon as the gears 25 and 28 are disengaged the pawls cooperate with the rachets to lock the shafts 13', 14' and prevent further rotation of these shafts. The mechanism for actuating the pawls includes the peripheral cam 55 on cam plate 40, cooperating with a rod 56 slidably mounted on the frame of the machine and connected by means of a link 57 to a bell crank lever 58. A link 59 connects the bell crank 58 to the pawl 53, and pawl 54 is connected to pawl 53 by a connecting rod 60 guided by pin 61 on the frame, so that when the bell crank lever 58 is rocked both pawls are drawn into engagement with rachets 51, 52. A spring 63 normally holds the bell crank 58 in position to cause engagement of the pawls with the rachets, the cam 55 holding the pawls out of engagement with the rachets. It is to be noted that the teeth on one of the rachet discs are oppositely disposed with respect to those on the other disc. This arrangement is designed to prevent rotation of the rolls or gears in either direction after the pawls are drawn into engagement with the rachets.

Since the number of teeth on the mutilated gears varies with each gear, it is necessary to provide adjustable cams to actuate the braking mechanism and the locking pawls. As shown in Fig. 4, the cams 41 and 55 are secured to cam plate 40 in such a manner that they may be adjusted circumferentially with respect to the shaft 26; to permit such adjustment the cam plate 40 is provided with a hole and cam 41 is provided with a number of holes 64 corresponding with the number of gears 28 and so spaced that the cams may be adjusted a distance corresponding to the distance between the teeth on the gears 28. Thus, when it is desired to change the degree of rotation of the rolls 11 and 12, the cams 41 and 55 are adjusted to actuate the braking and locking mechanisms immediately previous to the disengagement of gears 25 and 28 by aligning the proper hole in cam 41 with the hole in cam plate 40, a bolt 65 being provided to secure the cams in adjusted position on the cam plate. The holes in the cam are so marked that the proper holes may be aligned when the gear 25 is shifted to a new position on shaft 22.

It is sometimes desirable to employ several intermittently actuated mechanisms in a machine, these mechanisms operating alternately or in timed sequence. In a machine for feeding stock it is often desirable to perform one or more operations while the feed rolls are stationary. In the machine illustrated in the drawings cutting and punching attachments 66, 67 are shown, these attachments being actuated after the rolls have come to rest and the stock is stationary in the machine. As shown in Figures 3 and 4, the counter shaft 27 has secured thereto a gear 68 which meshes with one of the mutilated gears 28, preferably the gear having a number of teeth equal to the number of teeth on gear 68 so that shaft 27 makes one complete revolution with each revolution of shaft 26. The shafts 22 and 27 are on opposite sides of shaft 26, this arrangement permitting alternate and intermittent rotation of shafts 22 and 27; first shaft 22 is stationary while shaft 27 is rotating, and vice versa. A chain 69 drives shaft 70, passing around sprocket 71 on shaft 27 and sprocket 72 on shaft 70. Sprockets 73 and 74 are secured to shaft 70 and drive the cutter 66 and punch 67 respectively. The cutter 66 is given a reciprocating as well as a rotary movement, a slidable carriage 75 supporting a motor 76 for rotating cutter 66 and being reciprocated by means of a crank 77 and connecting rod 78 driven by sprocket 79, which latter sprocket is connected to sprocket 73 by the chain 80.

As in the case of the feed roll driving gear 25, it is necessary that the gear 68 be stopped and held in position after disengagement with the gear 28 to insure radial alignment of the teeth on the respective gears. This is accomplished by providing a disc 81 on shaft 27, this disc having a peripheral notch 82 adapted to be engaged by a projection or roller 83 on lever 84. The roller 83 is normally held in engagement with disc 81 by a spring 85, but is adapted to be released by a projection 86 on cam plate 40, against which projection the lever 84 bears. The projection 86 is positioned on the cam plate 40 so as to rock lever 84 just previous to the meshing of gears 28 and 68, the roller 73 then riding on the periphery of disc 81 until the notch 82 has made a complete turn. The spring 85 will then return the roller 83 to locking position in the notch and prevent further rotation of gear 68.

From the above description it will be seen that the invention provides means for transforming continuous rotary movement into intermittent rotary movement and that the degree of intermittent rotation may be varied by shifting a gear on one of the counter shafts. The mechanism also provides means for obtaining a plurality of intermittent rotary movements in timed sequence. Furthermore, the intermittently rotating shafts are positively locked in stationary position after disengagement with the continuously rotating driving shaft to insure accurate meshing of the gears upon re-engagement.

While a specific embodiment of the invention has been described in detail, it is obvious that the invention is susceptible to modification and is not limited to the exact arrangement described and illustrated.

I claim:

1. In a mechanism of the class described, the combination with a driving shaft and a driven shaft of a full gear upon the driven shaft, an interrupted gear upon the driving shaft adapted to mesh with the full gear on the driven shaft during a portion of the revolution of the driving shaft, means for arresting the movement of the driven shaft when the teeth of the gear on the driving shaft pass out of engagement with the teeth on the gear of the driven shaft, and means for locking the driven shaft immediately upon the disengagement of the teeth on said gears.

2. In a mechanism of the class described, the combination with a driving shaft and a driven shaft of a full gear upon the driven shaft, an interrupted gear upon the driving shaft adapted to mesh with the full gear on the driven shaft during a portion of the revolution of the driving shaft, means for arresting the movement of the driven shaft when the teeth of the gear on the driving shaft pass out of engagement with the teeth on the gear of the driven shaft, means for locking the driven shaft immediately upon the disengagement of the teeth on said gears, and means for unlocking said driven shaft upon the reengagement of the teeth of said gears.

3. In a mechanism of the class describd, the combination of a driving shaft and a driven shaft, of a full gear slideable on the driven shaft, a series of interrupted gears fixed to the driving shaft, said latter gears having different degrees of interruption, means for moving the gear on the driven shaft selectively into alignment with any of said interrupted gears, and means for locking the driven shaft when the teeth of the gear on the driven shaft are out of engagement with the teeth of the aligned gear on the driving shaft.

4. In a mechanism of the class described, the combination of a driving shaft and a driven shaft, of a full gear slideable on the driven shaft, a series of interrupted gears fixed to the driving shaft, said latter gears having different degrees of interruption, means for moving the gear on the driven shaft selectively into alignment with any of said interrupted gears, and means for locking the driven shaft when the teeth of the gear on the driven shaft are out of engagement with the teeth of the aligned gear on the driving shaft, and means for releasing said locking means when the teeth of the aligned gears again engage.

5. In a mechanism of the class described, the combination of a driving shaft and a driven shaft, of a full gear slidable on the driven shaft, a series of interrupted gears fixed to the driving shaft, said latter gears having different degrees of interruption, means for moving the gear on the driven shaft selectively into alignment with any of said interrupted gears, means for locking the driven shaft when the teeth of the gear on the driven shaft are out of engagement with the teeth of the aligned gear on the driving shaft, means for releasing said locking means when the teeth of the aligned gears again engage, and means for controlling said locking means bearing a predetermined relation to each of the interrupted gears.

6. In combination, a driving shaft and a driven shaft, means adapted to impart variable intermittent movement at the same speed of rotation to the driven shaft from the driving shaft and means for locking the driven shaft during the period of inactivity of said last mentioned means.

7. In combination, a driving shaft and a driven shaft, selective means for imparting variable intermittent movements to the driven shaft from the driving shaft, and means for locking said driven shaft during the periods of inactivity of said last mentioned means irrespective of the lengths of the periods of inactivity of the driven shaft.

8. In combination, a driving shaft, a driven shaft, means on said driving shaft for intermittently driving said driven shaft at the same speed of rotation, and means for varying the degree of intermittent rotation of said driven shaft.

9. In combination, a driving shaft, a driven shaft, means on said driving shaft for intermittently cooperating with and driving said driven shaft, means for varying the degree of said cooperation, and means for locking said driven shaft against further rotation when said driving means is in inoperative relation to said driven shaft.

10. In combination, a plurality of driving means, a driven element, each of said driving means being adapted to impart a different intermittent motion to said driven means at the same speed as the other driving means, and means for selectively engaging said driven means with any one of said driving means.

11. In combination, a driving shaft, a pair of driven shafts, and means on said driving shaft for intermittently driving said driven shafts, said driving means being in inoperative relation to one of said driven shafts during cooperative relation with the other of said shafts and means for varying the degree of intermittent rotation of at least one of said driven shafts.

12. In combination, a driving shaft, a pair of driven shafts, means on said driving shaft for intermittently driving said driven shafts, said driving means being in inoperative relation to one of said driven shafts during cooperative relation with the other of said shafts, means for varying the degree of intermittent rotation of at least one of said driven shafts and means for locking said driven shafts against rotation when in inoperative relation to said driving means.

13. In combination, a driving shaft and a driven shaft, selective means for imparting variable intermittent movements at the same speeds of rotation to the driven shaft from the driving shaft, and means for locking said driven shaft during the periods of inactivity of said last mentioned means, irrespective of the lengths of the periods of inactivity of the driven shaft.

14. In combination, a driving shaft and a driven shaft, means adapted to impart variable intermittent movement at the same speed to the driven shaft from the driving shaft, and means for arresting the movement of the driven shaft when said first mentioned means becomes inactive.

15. In combination, a driving shaft and a driven shaft, means adapted to impart variable intermittent movement at the same speed to the driven shaft from the driving shaft, means for arresting the movement of the driven shaft when said first mentioned means becomes inactive, and means for locking the driven shaft during the period of inactivity of said first mentioned means.

16. In combination, a driving shaft and a driven shaft, means adapted to impart variable intermittent movement at the same speed to the driven shaft comprising a full gear on one of said shafts, a series of interrupted gears on the other of said shafts, said latter gears having different degrees of interruption, and means for bringing said full gear selectively into alignment with any of said interrupted gears.

17. In combination, a driving shaft and a driven shaft, means adapted to impart variable intermittent movement at the same speed to the driven shaft comprising a full gear on one of said shafts, a series of interrupted gears on the other of said shafts, said latter gears having different degrees of interruption, means for bringing said full gear selectively into alignment with any of said interrupted gears, and means for arresting the movement of the driven shaft when said driven shaft is not in operative relation with respect to said driving shaft.

18. In combination, a driving member, a driven member, means on said driving member for intermittently cooperating with and driving said driven member, and means for varying the degree of cooperation to impart variable intermittent movement to said driven member at the same rate of speed.

19. In combination, a driving member, a driven member, means on said driving member for intermittently cooperating with and driving said driven member, means for varying the degree of said cooperation to impart variable intermittent movement to said driven member at the same rate of speed, and means for locking said driven member against further movement when said driving member is not in operative relation to said driven member.

20. In combination, a driving member, a driven member, means on said driving member for intermittently cooperating with and driving said driven member, means for varying the degree of said cooperation to impart variable intermittent movement to said driven member at the same rate of speed, means for arresting the movement of said driven member when said driving member becomes inoperative in relation to said driven member, and means for locking said driven member against further movement when said driving member is in inoperative relation to said driven member.

In testimony whereof, I have signed my name to this specification this 7th day of December, 1928.

THOMAS A. BEANEY.